US012621694B2

(12) United States Patent
Kimba Dit Adamou et al.

(10) Patent No.: US 12,621,694 B2
(45) Date of Patent: May 5, 2026

(54) REPORTING METHOD, RECEIVING METHOD, TERMINAL, AND NETWORK-SIDE DEVICE

(71) Applicant: VIVO MOBILE COMMUNICATION CO., LTD., Guangdong (CN)

(72) Inventors: Boubacar Kimba Dit Adamou, Chang'an Dongguan (CN); Xiaodong Yang, Chang'an Dongguan (CN); Qian Zheng, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 952 days.

(21) Appl. No.: 17/210,088

(22) Filed: Mar. 23, 2021

(65) Prior Publication Data

US 2021/0211918 A1 Jul. 8, 2021

Related U.S. Application Data

(63) Continuation of application No. PCT/CN2019/105306, filed on Sep. 11, 2019.

(30) Foreign Application Priority Data

Sep. 25, 2018 (CN) .......................... 201811116578.8

(51) Int. Cl.
H04W 24/10 (2009.01)
H04W 52/02 (2009.01)
H04W 56/00 (2009.01)

(52) U.S. Cl.
CPC ....... H04W 24/10 (2013.01); H04W 52/0209 (2013.01); H04W 56/001 (2013.01); Y02D 30/70 (2020.08)

(58) Field of Classification Search
CPC ... H04W 24/10; H04W 24/08; H04W 56/001; H04W 36/0088; H04W 24/02; H04W 48/16; H04W 56/0015; H04W 72/0446; H04W 36/0058; H04W 36/08; H04W 76/15; H04W 76/27; H04W 48/12;
(Continued)

(56) References Cited

U.S. PATENT DOCUMENTS

2017/0208491 A1* 7/2017 Xu ......................... H04W 24/10
2019/0342801 A1* 11/2019 Cui ....................... H04W 72/23
(Continued)

FOREIGN PATENT DOCUMENTS

CN 102857963 A 1/2013
CN 103327514 A 9/2013
(Continued)

OTHER PUBLICATIONS

CN Office Action in Application No. 201811116578.8 dated Jul. 7, 2021.
(Continued)

*Primary Examiner* — Kwasi Karikari
(74) *Attorney, Agent, or Firm* — BROOKS KUSHMAN P.C.

(57) ABSTRACT

A reporting method, a receiving method, a terminal, and a network-side device are provided. The reporting method includes: transmitting a reporting message to a first network-side device, where the reporting message carries already-recorded SMTC configuration information of a first cell.

13 Claims, 3 Drawing Sheets

(58) Field of Classification Search
CPC ............. H04W 36/0085; H04W 56/00; H04W 36/0061; H04W 36/00; H04W 8/24; H04W 36/305; H04W 48/20; H04W 76/10
See application file for complete search history.

(56) References Cited

U.S. PATENT DOCUMENTS

2021/0051618 A1*   2/2021   Yang ..................... H04W 48/08
2023/0121806 A1*   4/2023   Li ......................... H04W 24/10
                                                          370/329

FOREIGN PATENT DOCUMENTS

WO        2018/144781 A1     8/2018
WO        2018/164515 A1     9/2018

OTHER PUBLICATIONS

"FFS discussion on measurement gap for EN-DC" 3GPP TSG-RAN WG2 NR Ad hoc 1801, Nokia, Nokia Shanghai Bell, R2-1800817, Jan. 22, 2018.
"Assistance Information for Measurement Gap Configuration" 2GPP TSG-RAN WG2 NR AdHoc 1801, Cmcc, R2-1801260, Jan. 22, 2018.
"Inter node message for CSI-RS configuration" 3GPP TSG-RAN WG2#AH1807, Huawei, HiSilicon, R2-1810364, Jul. 2, 2018.
"Discussion on how to count carriers in EN-DC" 3GPP TSG-RAN WG4 Meeting #87, Nokia, Nokia Shanghai Bell, R4-1807764, May 21, 2018.
Written Opinion and International Search Report in Application No. PCT/CN2019/105306 dated Apr. 8, 2021.
JP Office Action in Application No. 2021-516892 Dated May 31, 2022.
"Discussion on dual SMTC periodicity" 3GPP TSG-RAN WG4 Meeting #88, MediaTek Inc., R4-1810948, Aug. 20, 2018.

* cited by examiner

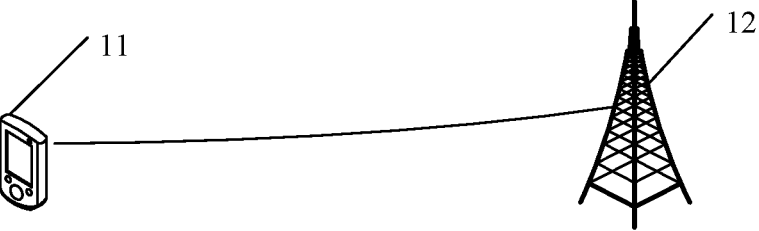

FIG. 1

| Transmit a reporting message to a network-side device, where the reporting message carries synchronization broadcast signal block measurement timing configuration SMTC configuration information of a first cell | 201 |

FIG. 2

| Receive a reporting message transmitted by a first terminal, where the reporting message carries SMTC configuration information of a first cell | 301 |

Terminal

First transmitting module    401

Network-side device

First receiving module — 501

600

Terminal 611  601

Power supply

Radio frequency unit

Network module — 602

Audio output unit — 603

610

609 — Memory

Application program

Operating system

Processor

Input unit — 604

Graphics processing unit — 6041

Microphone — 6042

608 — Interface unit

Sensor — 605

User input unit — 6071

607 — Touch panel

Other input devices

Display unit

Display panel — 606

6072

6061

REPORTING METHOD, RECEIVING METHOD, TERMINAL, AND NETWORK-SIDE DEVICE

CROSS-REFERENCE TO RELATED APPLICATIONS

This application is a continuation application of PCT Application No. PCT/CN2019/105306 filed on Sep. 11, 2019, which claims priority to Chinese Patent Application No. 201811116578.8 filed in China on Sep. 25, 2018, both of which are incorporated herein by reference in their entireties.

TECHNICAL FIELD

Embodiments of this disclosure relate to the field of communications technologies, and in particular, to a reporting method, a receiving method, a terminal, and a network-side device.

BACKGROUND

In a scenario of reselection, initiating connection establishment, or initiating connection recovery, a terminal needs to read a synchronization signal/physical broadcast channel (SS/PBCH) block of a cell. The SS/PBCH block may also be referred to as a synchronization broadcast signal block.

In the related art, the terminal reads the SS/PBCH block of the cell through blind detection, thereby increasing power consumption of the terminal.

SUMMARY

According to a first aspect, an embodiment of this disclosure provides a reporting method, applied to a terminal, where the reporting method includes:

transmitting a reporting message to a first network-side device, where the reporting message carries synchronization broadcast signal block measurement timing configuration SMTC configuration information of a first cell.

According to a second aspect, an embodiment of this disclosure provides a receiving method, applied to a network-side device, where the receiving method includes:

receiving a reporting message transmitted by a first terminal, where the reporting message carries SMTC configuration information of a first cell.

According to a third aspect, an embodiment of this disclosure further provides a terminal, where the terminal includes:

a first transmitting module, configured to transmit a reporting message to a first network-side device, where the reporting message carries synchronization broadcast signal block measurement timing configuration SMTC configuration information of a first cell.

According to a fourth aspect, an embodiment of this disclosure further provides a network-side device, where the network-side device includes:

a first receiving module, configured to receive a reporting message transmitted by a first terminal, where the reporting message carries SMTC configuration information of a first cell.

According to a fifth aspect, an embodiment of this disclosure further provides a terminal, where the terminal includes a processor, a memory, and a computer program stored in the memory and capable of running on the processor. When the computer program is executed by the processor, the steps of the reporting method described above are implemented.

According to a sixth aspect, an embodiment of this disclosure further provides a network-side device, where the network-side device includes a processor, a memory, and a computer program stored in the memory and capable of running on the processor. When the computer program is executed by the processor, the steps of the receiving method described above are implemented.

According to a seventh aspect, an embodiment of this disclosure further provides a non-transitory computer-readable storage medium. The non-transitory computer-readable storage medium stores a computer program, and when the computer program is executed by a processor, the steps of the reporting method described above or the steps of the receiving method described above are implemented.

BRIEF DESCRIPTION OF DRAWINGS

To describe the technical solutions in the embodiments of this disclosure more clearly, the following briefly introduces the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

FIG. 1 is a structural diagram of a network system applicable to an embodiment of this disclosure;

FIG. 2 is a flowchart of a reporting method according to an embodiment of this disclosure;

FIG. 3 is a flowchart of a receiving method according to an embodiment of this disclosure;

FIG. 4 is a structural diagram 1 of a terminal according to an embodiment of this disclosure;

DESCRIPTION OF EMBODIMENTS

Figures 5, 6:
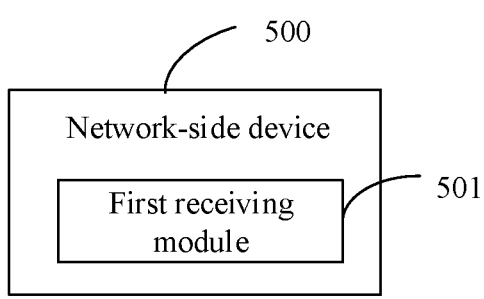
FIG. 5 is a structural diagram 1 of a network-side device according to an embodiment of this disclosure.
FIG. 6 is a structural diagram 2 of a terminal according to an embodiment of this disclosure.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

In the specification and claims of this application, the terms such as "first" and "second" are intended to distinguish between similar objects but do not necessarily indicate a specific order or sequence. Moreover, the terms "include", "have" and any other variants mean to cover the non-exclusive inclusion, for example, a process, method, system, product, or device that includes a list of steps or units is not necessarily limited to those units, but may include other units not expressly listed or inherent to such a process, method, system, product, or device. In addition, the use of "and/or" in this application represents presence of at least one of the connected objects. For example, A and/or B and/or C represents the following seven cases: A alone, B alone, C alone, both A and B, both B and C, both A and C, and all of A, B, and C.

Referring to FIG. 1, FIG. 1 is a structural diagram of a network system applicable to an embodiment of this disclosure. As shown in FIG. 1, a terminal 11 and a network-side device 12 are included, and the terminal 11 and the network-side device 12 may communicate through the network.

In the embodiments of this disclosure, the terminal 11 may also be referred to as user equipment (UE). In actual implementation, the terminal 11 may be a terminal-side device such as a mobile phone, a tablet computer (Tablet Personal Computer), a laptop computer, a personal digital assistant (PDA), a mobile Internet device (MID), a wearable device, or an in-vehicle device. It should be noted that a specific type of the terminal 11 is not limited in the embodiments of this disclosure.

The network-side device 12 may be a base station, a relay, an access point, a mobility management entity (MME), an access management function (AMF), a gateway, or the like. The base station may be a base station of 5G and a later version (for example, a 5G NR NB), or a base station in another communications system (for example, an evolved base station (evolved Node B, eNB). It should be noted that a specific type of the network-side device 12 is not limited in the embodiments of this disclosure.

For ease of description, the following describes some content included in the embodiments of this disclosure.

The network-side device may configure a synchronization signal/physical broadcast channel block measurement timing configuration or a synchronization broadcast signal block measurement timing configuration (SS/PBCH Block Measurement Timing Configuration, SMTC) for connected-state UE. For example, a cell A configures SMTC of a cell B for the UE in a radio resource control (RRC) release message. Based on the SMTC configuration information of the cell B, the UE may know to read an SS/PBCH block in system information of the cell B, including a position and length of the SS/PBCH block.

The following describes the reporting method in the embodiments of this disclosure.

Referring to FIG. 2, FIG. 2 is a flowchart 1 of a reporting method according to an embodiment of this disclosure. The reporting method in this embodiment is applied to a terminal. As shown in FIG. 2, the reporting method in this embodiment includes the following steps:

Step 201: Transmit a reporting message to a first network-side device, where the reporting message carries already-recorded synchronization broadcast signal block measurement timing configuration SMTC configuration information of a first cell.

UE in this embodiment has recorded the SMTC configuration information of the first cell. Therefore, it is easy to understand that before the transmitting the reporting message to the first network-side device, the reporting method may further include: obtaining the SMTC configuration information of the first cell.

During specific implementation, the UE in this embodiment may obtain the SMTC configuration information of the first cell in a plurality of manners. Optionally, the obtaining the SMTC configuration information of the first cell may include:

manner 1. receiving SMTC configuration information of the first cell transmitted by a second network-side device;

or, manner 2. calculating the SMTC configuration information of the first cell based on a blindly detected synchronization broadcast signal SS/PBCH block of the first cell.

For the manner 1, in practical application, a serving cell may configure SMTC configuration information of a neighboring cell for the UE. When a cell A configures SMTC configuration information of a cell B for the UE, the UE may receive and record the SMTC configuration information of the cell B.

It should be understood that, in Manner 1, the network-side device that transmits the SMTC configuration information of the first cell may be different from the network-side device that receives the reporting message transmitted by the UE in this embodiment.

For the manner 2, the network-side device does not configure the SMTC configuration information of the first cell for the UE. When the UE is to access the first cell, the UE may read the SS/PBCH block of the first cell through blind detection, may read information such as a position and length of the SS/PBCH block of the first cell, and calculate the SMTC configuration information of the first cell.

The SMTC configuration information of the first cell that is obtained in any one of the foregoing manners can be stored for a period of time to facilitate subsequent reporting.

In a specific embodiment of this disclosure, the first network-side device and the second network-side device may be the same device or different devices.

For example, the first network-side device is a base station A corresponding to a cell accessed before reselection, and the second network-side device may be a base station B corresponding to a second cell reselected by the terminal.

The first network-side device may alternatively be the same base station to which the first cell and the second cell belong.

Optionally, after the obtaining the SMTC configuration information of the first cell, the following step is further included:

in a case in which the terminal enters an idle state or an inactive state from a connected state in the first cell, retaining the SMTC configuration information of the first cell.

In other words, regardless of a specific form of a connection status of the UE in the first cell, the UE may always record (store) the SMTC configuration information of the first cell. On the one hand, the UE may report the SMTC configuration information of the first cell to the network-side device, to enrich SMTC configuration information of cells stored in the network-side device; on the other hand, when the UE needs to re-access the first cell, the UE may directly extract the stored SMTC configuration information of the first cell to read or measure the SS/PBCH block of the first cell, so as to accelerate a process of accessing the first cell by the UE.

In this embodiment, the UE may trigger transmission of the reporting message after moving to another cell. In specific implementation, the UE may proactively trigger or passively trigger the transmission of the reporting message.

Optionally, the transmitting a reporting message to a first network-side device includes:

in a process of establishing a connection to a second cell or after access to the second cell, transmitting the SMTC configuration information of the first cell to the network-side device.

In specific implementation, the UE moves to the second cell to initiate connection establishment or initiate connection reestablishment. In the process of establishing the connection to the second cell or after access to the second cell, the UE may proactively transmit the SMTC configuration information of the first cell recorded by the UE to the network-side device.

In the process in which the UE establishes the connection to the second cell, the reporting message carrying the SMTC configuration information of the first cell may be a message during connection establishment.

Optionally, before the transmitting a reporting message to a first network-side device, the following step is further included:

in a process of establishing a connection to the second cell or after access to the second cell, transmitting a notification message to the network-side device, where the notification message is used to notify the network-side device that the terminal has recorded the SMTC configuration information of the first cell.

The transmitting a reporting message to a first network-side device includes:

transmitting the reporting message to the first network-side device in a case in which a reporting indication message transmitted by the network-side device is received.

During specific implementation, identification information may be carried in the notification message to indicate that the terminal has recorded the SMTC configuration information of the first cell. The identification information may be a cell identity of the first cell, which is not limited thereto.

In a specific embodiment of this disclosure, the notification message may be a separately set message. Considering that the SMTC configuration information is already included in minimization of drive tests (MDT) data, in order to decrease system complexity and reduce system overheads, in this embodiment of this disclosure, optionally, the notification message may reuse a minimization of drive tests (MDT) data reporting message.

In this embodiment, the UE transmits the notification message to the network-side device in the process of establishing the connection to the second cell or after access to the second cell, so as to notify the network-side device that the UE has recorded the SMTC configuration of the first cell; and the UE transmits the reporting message to the first network-side device only after the reporting indication message that is transmitted by the network-side device.

In this way, when the network-side device does not need the SMTC configuration information that the UE has recorded, the UE cannot receive the reporting indication message transmitted by the network-side device; or in a scenario in which a received message indicates that the UE does not need to report, the UE may not transmit the reporting message to the first network-side device, thereby skipping the operation of transmitting the reporting message by the UE compared to proactively transmitting the reporting message directly to the first network-side device by the UE, and further reducing power consumption of the UE.

In this embodiment, in addition to the SMTC configuration information of the first cell, the reporting message may also carry other information. Optionally, the reporting message may further include at least one of the following information: an identification identifier, a public land mobile network (PLMN) list, a tracking area code (TAC), a radio access network-based notification area code (RANAC), and a cell frequency. The identification identifier may be a physical cell identifier (PCI) or a unique identification identifier of the cell.

It should be noted that various optional implementations described in this embodiment of this disclosure may be implemented in combination or may be implemented independently, which is not limited in this embodiment of this disclosure.

According to the reporting method in this embodiment, the first terminal transmits the reporting message to the first network-side device, where the reporting message carries the already-recorded SMTC configuration information of the first cell. In this way, the network-side device may obtain the SMTC configuration information of the first cell after receiving the reporting message. On the one hand, this can enrich the SMTC configuration information of the cells stored in the network-side device; on the other hand, the network-side device may perform SMTC configuration for the second terminal by using the obtained SMTC configuration information of the first cell, thereby preventing the second terminal from reading an SS/PBCH block of the first cell through blind detection, accelerating a rate of reading the SS/PBCH block of the first cell, and further reducing power consumption of the second terminal.

Referring to FIG. 3, FIG. 3 is a flowchart of a receiving method according to an embodiment of this disclosure. The receiving method in this embodiment is applied to a network-side device.

As shown in FIG. 3, the receiving method in this embodiment may include the following steps.

Step 301: Receive a reporting message transmitted by a first terminal, where the reporting message carries SMTC configuration information of a first cell that has been recorded by the terminal.

Optionally, before the receiving a reporting message transmitted by a first terminal, the following steps are further included:

receiving a notification message that is transmitted by the first terminal in a process of establishing a connection to a second cell or after access to the second cell, where the notification message is used to notify the network-side device that the terminal has recorded the SMTC configuration information of the first cell; and transmitting a reporting indication message to the first terminal.

The receiving a reporting message transmitted by a first terminal includes:

receiving the reporting message that is transmitted by the first terminal based on the reporting indication message.

It should be noted that this implementation corresponds to the manner in which the UE passively transmits the reporting message in the method embodiment in FIG. 2. For details, refer to the description of related content in the method embodiment in FIG. 2. Details are not repeated herein.

In specific implementation, the network-side device may determine whether the SMTC configuration information of the first cell has been recorded, so as to determine whether to transmit the reporting indication message to the first terminal.

If detecting that the SMTC configuration information of the first cell has been recorded, the network-side device may not transmit the reporting indication message to the first terminal, thereby skipping the operation of transmitting the reporting message by the first terminal, and reducing power consumption of the first terminal.

If detecting that the SMTC configuration information of the first cell has not been recorded, the network-side device may transmit the reporting indication message to the first terminal, so as to instruct the first terminal to transmit the reporting message, thereby enriching the SMTC configuration information of the cells stored in the network-side device.

Optionally, after the receiving a reporting message transmitted by a first terminal, the following step is further included:

forwarding the SMTC configuration information to another network-side device.

In specific implementation, the another network-side device may be specifically at least one of the following: another base station cell, a trace collection entity (TCE), a gateway, a mobility management entity (MME), and an access and mobility management Function (AMF).

In this way, the another network-side device may also record the SMTC configuration information of the first cell, and configure the SMTC configuration information of the first cell for other terminals, so that the other terminals can read and measure an SS/PBCH block of the first cell based on the SMTC configuration information of the first cell, thereby accelerating a rate of reading the SS/PBCH block of the first cell and reducing power consumption of the terminals.

Specifically, in a scenario of reselection, initiating connection establishment, or initiating connection recovery, the UE may read the SS/PBCH block of the first cell at a first position of the SS/PBCH block of the first cell, indicated by the first SMTC configuration information of the first cell, thereby accelerating the process of reselection, initiating connection establishment, or initiating connection recovery.

Optionally, after the receiving a reporting message transmitted by a first terminal, the following step is further included:

performing SMTC configuration for a second terminal by using the SMTC configuration information of the first cell.

In specific implementation, the second terminal may be an idle-state or inactive-state terminal that camps on the first cell, or may be a terminal with an RRC connection to the second cell.

In this embodiment, the SMTC configuration information of the first cell is used to instruct to read and measure a position of the SS/PBCH block of the first cell. Therefore, by using the receiving method of this embodiment, the second terminal can read and measure the SS/PBCH block of the first cell based on the SMTC configuration information of the first cell, thereby accelerating a rate of reading the SS/PBCH block of the first cell, and reducing power consumption of the second terminal.

It should be noted that various optional implementations described in this embodiment of this disclosure may be implemented in combination or may be implemented independently, which is not limited in this embodiment of this disclosure.

In addition, this embodiment is used as an implementation of the network-side device corresponding to the foregoing method embodiment. Therefore, for related content, reference may be made to the related description in the foregoing method embodiment, and the same beneficial effects can be achieved. To avoid repetition, details are not described herein again.

According to this embodiment of this disclosure, the UE may record and report SMTC configuration information of a cell, which helps the network-side device to configure the SMTC configuration information of the cell for other UEs, thereby preventing the UEs from repeatedly performing blind detection on the SS/PBCH block of the cell, and reducing power consumption of the UEs.

Referring to FIG. 4, FIG. 4 is a structural diagram 1 of a terminal according to an embodiment of this disclosure. As shown in FIG. 4, the terminal 400 includes:

a first transmitting module 401, configured to transmit a reporting message to a first network-side device, where the reporting message carries already-recorded synchronization broadcast signal block measurement timing configuration SMTC configuration information of a first cell.

Optionally, the terminal 400 further includes:

an obtaining module, configured to obtain the SMTC configuration information of the first cell before the reporting message is transmitted to the first network-side device.

Optionally, the obtaining module is specifically configured to:

receive SMTC configuration information of the first cell transmitted by a second network-side device; or calculate the SMTC configuration information of the first cell based on a blindly detected synchronization broadcast signal SS/PBCH block of the first cell.

Optionally, the terminal 400 further includes:

a retaining module, configured to: after the SMTC configuration information of the first cell is obtained, retain the SMTC configuration information of the first cell in a case in which the terminal enters an idle state or an inactive state from a connected state in the first cell.

Optionally, the first transmitting module 401 is specifically configured to:

in a process of establishing a connection to a second cell or after access to the second cell, transmit the SMTC configuration information of the first cell to the network-side device.

Optionally, the terminal 400 further includes:

a second transmitting module, configured to: before the reporting message is transmitted to the first network-side device, transmit a notification message to the network-side device in a process of establishing a connection to a second cell or after access to the second cell, where the notification message is used to notify the network-side device that the terminal has recorded the SMTC configuration information of the first cell.

The first transmitting module 401 is specifically configured to:

transmit the reporting message to the first network-side device in a case in which a reporting indication message transmitted by the network-side device is received.

Optionally, the notification message is a minimization of drive tests MDT data reporting message.

Optionally, the reporting message may further include at least one of the following information: an identification identifier, a public land mobile network PLMN list, a tracking area code TAC, a RANAC, and a cell frequency.

The terminal 400 is capable of implementing the processes of the method embodiment in FIG. 2 in this disclosure, with the same beneficial effects achieved. To avoid repetition, details are not described herein again.

Referring to FIG. 5, FIG. 5 is a structural diagram 1 of a network-side device according to an embodiment of this disclosure. As shown in FIG. 5, the network-side device 500 includes:

a first receiving module 501, configured to receive a reporting message transmitted by a first terminal, where the reporting message carries SMTC configuration information of a first cell that has been recorded by the terminal.

Optionally, the network-side device 500 further includes:

a second receiving module, configured to: before the reporting message transmitted by the first terminal is received, receive a notification message that is transmitted by the first terminal in a process of establishing a connection to a second cell or after access to the second cell, where the notification message is used to notify the network-side device that the terminal has recorded the SMTC configuration information of the first cell; and a third transmitting module, configured to transmit a reporting indication message to the first terminal.

The first receiving module 501 is specifically configured to:

receive the reporting message that is transmitted by the first terminal based on the reporting indication message.

Optionally, the notification message is a minimization of drive tests (Minimization of Drive Tests, MDT) data reporting message.

Optionally, the network-side device 500 further includes:

a forwarding module, configured to: after the reporting message transmitted by the first terminal is received, forward the SMTC configuration information to another network-side device.

Optionally, the network-side device 500 further includes:

a configuration module, configured to: after the reporting message transmitted by the first terminal is received, perform SMTC configuration for a second terminal by using the SMTC configuration information of the first cell.

The network-side device 500 is capable of implementing the processes of the method embodiment in FIG. 3 in this disclosure, with the same beneficial effects achieved. To avoid repetition, details are not described herein again.

Referring to FIG. 6, FIG. 6 is a structural diagram 2 of a terminal according to an embodiment of this disclosure. The terminal may be a schematic diagram of a hardware structure of a terminal that implements various embodiments of this disclosure. As shown in FIG. 6, the terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal shown in FIG. 6 does not constitute any limitation on the terminal. The terminal may include more or fewer components than those shown in the figure, or a combination of some components, or the components disposed differently. In this embodiment of this disclosure, the terminal includes but is not limited to a mobile phone, a tablet computer, a laptop computer, a personal digital assistant, an in-vehicle terminal, a wearable device, a pedometer, and the like.

The radio frequency unit 601 is configured to:

transmit a reporting message to a first network-side device, where the reporting message carries already-recorded synchronization broadcast signal block measurement timing configuration SMTC configuration information of a first cell.

Optionally, the processor 610 is configured to obtain the SMTC configuration information of the first cell.

Optionally, the radio frequency unit 601 is further configured to:

receive SMTC configuration information of the first cell transmitted by a second network-side device; or the processor 610 is further configured to:

calculate the SMTC configuration information of the first cell based on a blindly detected synchronization broadcast signal SS/PBCH block of the first cell.

Optionally, the processor 610 is further configured to:

in a case in which the terminal enters an idle state or an inactive state from a connected state in the first cell, retain the SMTC configuration information of the first cell.

Optionally, the radio frequency unit 601 is further configured to:

in a process of establishing a connection to a second cell or after access to the second cell, transmit the SMTC configuration information of the first cell to the network-side device.

Optionally, the radio frequency unit 601 is further configured to:

in a process of establishing a connection to the second cell or after access to the second cell, transmit a notification message to the network-side device, where the notification message is used to notify the network-side device that the terminal has recorded the SMTC configuration information of the first cell; and transmit the reporting message to the first network-side device in a case in which a reporting indication message transmitted by the network-side device is received.

Optionally, the notification message is a minimization of drive tests MDT data reporting message.

Optionally, the reporting message may further include at least one of the following information: an identification identifier, a public land mobile network PLMN list, a tracking area code TAC, a RANAC, and a cell frequency.

It should be noted that the terminal 600 in this embodiment is capable of implementing the processes of the method embodiment in the embodiments of this disclosure, with the same beneficial effects achieved. To avoid repetition, details are not described herein again.

It should be understood that in this embodiment of this disclosure, the radio frequency unit 601 may be configured to: receive and transmit signals in an information receiving/sending process or a call process; and specifically, after receiving downlink data from a base station, transmit the downlink information to the processor 610 for processing, and in addition, transmit uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device through a wireless communications system.

The terminal provides a user with wireless broadband internet access through the network module 602, for example, helping the user to transmit and receive e-mails, browse web pages, and access streaming media.

The audio output unit 603 may convert audio data received by the radio frequency unit 601 or the network module 602 or stored in the memory 609 into an audio signal, and output the audio signal as a sound. Furthermore, the audio output unit 603 may also provide audio output (for example, a call signal received sound or a message received sound) related to a specific function performed by the terminal 600. The audio output unit 603 includes a speaker, a buzzer, a receiver, and the like.

The input unit 604 is configured to receive an audio or video signal. The input unit 604 may include a graphics processing unit (GPU) 6041 and a microphone 6042. The graphics processing unit 6041 processes image data of a still picture or video obtained by an image capture apparatus (such as a camera) in a video capture mode or an image capture mode. A processed image frame may be displayed on the display unit 606. An image frame processed by the graphics processing unit 6041 may be stored in the memory 609 (or another storage medium) or transmitted by the radio frequency unit 601 or the network module 602. The microphone 6042 can receive a sound and can process the sound into audio data. The processed audio data may be converted in a telephone call mode into a format that can be transmitted by the radio frequency unit 601 to a mobile communications base station, for outputting.

The terminal 600 may further include at least one sensor 605, for example, an optical sensor, a motion sensor, and other sensors. Specifically, the optical sensor may include an ambient light sensor and a proximity sensor. The ambient light sensor may adjust luminance of the display panel 6061 based on brightness of ambient light, and the proximity sensor may turn off the display panel 6061 and/or backlight when the terminal 600 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided to the user. The display unit 606 may include a display panel 6061, and the display panel 6061 may be configured in a form of a liquid crystal display (LCD), an organic light-emitting diode (OLED), or the like.

The user input unit 607 may be configured to receive input digit or character information and generate key signal input related to user setting and function control of the mobile terminal. Specifically, the user input unit 607 may include a touch panel 6071 and other input devices 6072. The touch panel 6071, also referred to as a touchscreen, may capture a touch operation performed by the user on or near the touch panel (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, transmits the point coordinates to the processor 610, and receives and executes a command transmitted by the processor 610. In addition, the touch panel 6071 may be implemented in a plurality of forms, for example, a resistive, capacitive, infrared, or surface acoustic wave touch panel. In addition to the touch panel 6071, the user input unit 607 may further include other input devices 6072. Specifically, the other input devices 6072 may include but are not limited to a physical keyboard, a function key (such as a volume control key or a power on/off key), a trackball, a mouse, a joystick, and the like. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then, the processor 610 provides a corresponding visual output on the display panel 6061 based on the type of the touch event. Although in FIG. 6, the touch panel 6071 and the display panel 6061 act as two independent components to implement input and output functions of the terminal, in some embodiments, the touch panel 6071 and the display panel 6061 may be integrated to implement the input and output functions of the terminal. This is not specifically limited herein.

The interface unit 608 is an interface between an external apparatus and the terminal 600. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 608 may be configured to receive an input (for example, data information or power) from an external apparatus and transmit the received input to one or more elements within the terminal 600, or may be configured to transmit data between the terminal 600 and the external apparatus.

The memory 609 may be configured to store software programs and various data. The memory 609 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 609 may include a high-speed random access memory, and may further include a non-volatile memory such as a disk storage device, a flash memory device, or another volatile solid-state storage device.

The processor 610 is a control center of the terminal, and is connected to all components of the terminal by using various interfaces and lines. By running or executing a software program and/or module that is stored in the memory 609 and calling data stored in the memory 609, the processor 610 executes various functions of the terminal and processes data, so as to perform overall monitoring on the terminal. The processor 610 may include one or more processing units. Optionally, an application processor and a modem processor may be integrated in the processor 610. The application processor primarily processes an operating system, user interfaces, application programs, and the like. The modem processor primarily processes radio communication. It can be understood that the modem processor may alternatively be not integrated in the processor 610.

The terminal 600 may further include the power supply 611 (for example, a battery) supplying power to all components. Optionally, the power supply 611 may be logically connected to the processor 610 through a power management system. In this way, functions such as charge management, discharge management, and power consumption management are implemented by using the power management system.

In addition, the terminal 600 includes some functional modules that are not shown. Details are not described herein.

Preferably, an embodiment of this disclosure further provides a terminal, including a processor 610, a memory 609, and a computer program stored in the memory 609 and running on the processor 610. When the computer program is executed by the processor 610, processes of the foregoing reporting method embodiment can be implemented and a same technical effect can be achieved. To avoid repetition, details are not described herein again.

Figure 7:
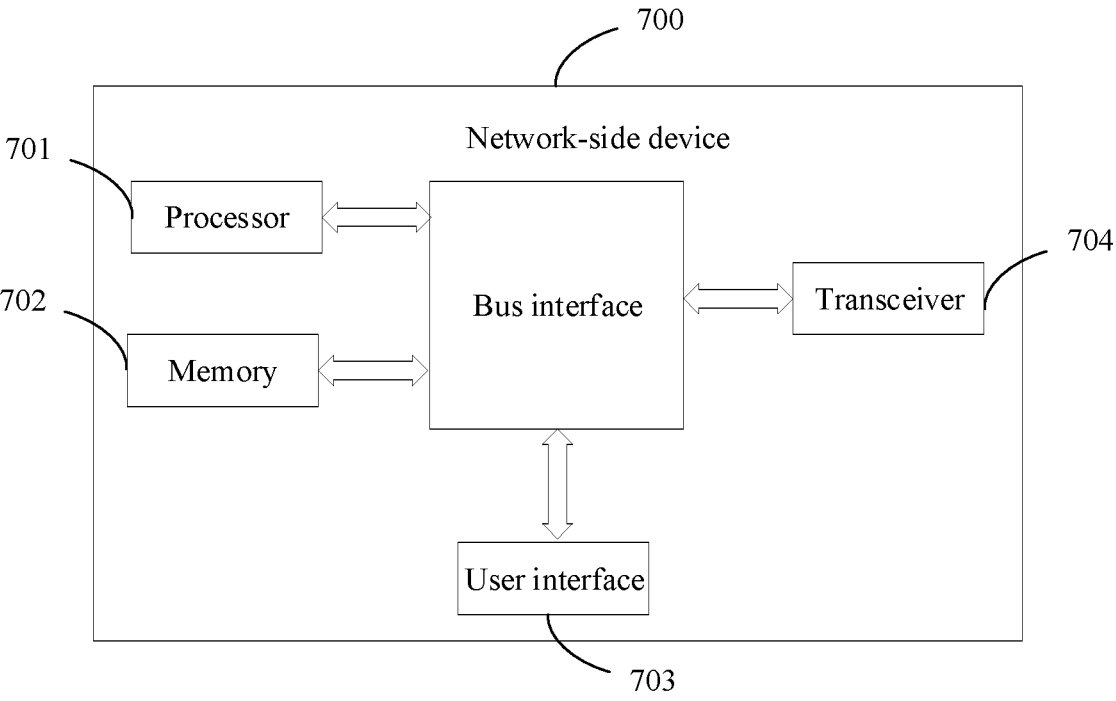
FIG. 7 is a structural diagram 2 of a network-side device according to an embodiment of this disclosure.

Referring to FIG. 7, FIG. 7 is a structural diagram 2 of a network-side device according to an embodiment of this disclosure. As shown in FIG. 7, the network-side device 700 includes a processor 701, a memory 702, a user interface 703, a transceiver 704, and a bus interface.

In this embodiment of this disclosure, the network-side device 700 further includes a computer program stored in the memory 702 and capable of running on the processor 701. When the computer program is executed by the processor 701, the following step is implemented:

receiving a reporting message transmitted by a first terminal, where the reporting message carries SMTC configuration information of a first cell that has been recorded by the terminal.

Optionally, when the computer program is executed by the processor 701, the following steps may be further implemented:

receiving a notification message that is transmitted by the first terminal in a process of establishing a connection to a second cell or after access to the second cell, where the notification message is used to notify the network-side device that the terminal has recorded the SMTC configuration information of the first cell;

transmitting a reporting indication message to the first terminal; and receiving the reporting message that is transmitted by the first terminal based on the reporting indication message.

Optionally, the notification message is a minimization of drive tests (MDT) data reporting message.

Optionally, when the computer program is executed by the processor 701, the following step may be further implemented:

forwarding the SMTC configuration information to another network-side device.

Optionally, when the computer program is executed by the processor 701, the following step may be further implemented:

performing SMTC configuration for a second terminal by using the SMTC configuration information of the first cell.

In FIG. 7, a bus architecture may include any quantity of interconnected buses and bridges, and specifically connects together circuits that are of one or more processors represented by the processor 701 and of a memory represented by the memory 702. The bus architecture may further interconnect various other circuits such as a peripheral device, a voltage regulator, and a power management circuit. These are all well known in the art, and therefore are not further described in this specification. The bus interface provides an interface. The transceiver 704 may be a plurality of components, including a transmitter and a receiver, and provides units for communicating with a variety of other apparatuses on a transmission medium. For different user equipments, the user interface 703 may also be an interface that can be externally or internally connected to a required device. The connected device includes but is not limited to a keypad, a display, a speaker, a microphone, a joystick, and the like.

The processor 701 is responsible for management of the bus architecture and general processing, and the memory 702 is capable of storing data that is used by the processor 701 during operation.

The network-side device 700 is capable of implementing the processes and beneficial effects implemented by the network-side device in the method embodiment in FIG. 3. To avoid repetition, details are not described herein again.

An embodiment of this disclosure further provides a computer readable storage medium, where a computer program is stored in the computer readable storage medium. When the computer program is executed by a processor, processes of the foregoing reporting method or receiving method embodiment can be implemented. To avoid repetition, details are not described herein again. The computer-readable storage medium is, for example, a read-only memory (Read-Only Memory, ROM), a random access memory (Random Access Memory, RAM), a magnetic disk, or an optical disc.

It should be noted that the terms "include", "comprise", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more restrictions, an element preceded by "includes a . . . " does not preclude the existence of other identical elements in the process, method, article, or apparatus that includes the element.

According to the foregoing description of the implementation manners, a person skilled in the art may clearly understand that the methods in the foregoing embodiments may be implemented by using software in combination with a necessary common hardware platform, and certainly may alternatively be implemented by using hardware. However, in most cases, the former is a preferred implementation manner. Based on such an understanding, the technical solutions of this disclosure essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network-side device, or the like) to perform the methods described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A reporting method, performed by a terminal and comprising:

transmitting a reporting message to a first network-side device, wherein the reporting message carries synchronization broadcast signal block measurement timing configuration (SMTC) configuration information of a first cell;

wherein the transmitting the reporting message to the first network-side device comprises:

in a process of establishing a connection to a second cell or after access to the second cell, transmitting the SMTC configuration information of the first cell to the first network-side device;

or, wherein, before the transmitting the reporting message to the first network-side device, the method further comprises:

in a process of establishing a connection to a second cell or after access to the second cell, transmitting a notification message to the first network-side device, wherein the notification message is used to notify the first network-side device that the terminal has recorded the SMTC configuration information of the first cell; and the transmitting the reporting message to the first network-side device comprises:

in a case in which a reporting indication message transmitted by the first network-side device is received, transmitting the reporting message to the first network-side device.

2. The reporting method according to claim 1, wherein, before the transmitting the reporting message to the first network-side device, the method further comprises:

obtaining the SMTC configuration information of the first cell.

3. The reporting method according to claim 2, wherein the obtaining the SMTC configuration information of the first cell comprises:

receiving SMTC configuration information of the first cell transmitted by a second network-side device; or calculating the SMTC configuration information of the first cell based on a blindly detected synchronization broadcast signal (SS/PBCH) block of the first cell.

4. The reporting method according to claim 2, wherein, after the obtaining the SMTC configuration information of the first cell, the method further comprises:

in a case in which the terminal enters an idle state or an inactive state from a connected state in the first cell, retaining the SMTC configuration information of the first cell.

5. The reporting method according to claim 1, wherein the notification message is a minimization of drive tests (MDT) data reporting message.

6. The reporting method according to claim 1, wherein the reporting message further comprises at least one of the following information: an identification identifier, a public land mobile network (PLMN) list, a tracking area code (TAC), a radio access network-based notification area code (RANAC), and a cell frequency.

7. A receiving method, performed by a first network-side device and comprising:

receiving a reporting message transmitted by a first terminal, wherein the reporting message carries SMTC configuration information of a first cell;

wherein the receiving the reporting message transmitted by the first terminal comprises:

receiving the SMTC configuration information of the first cell that is transmitted by the first terminal in a process of establishing a connection to a second cell or after access to the second cell;

or, wherein, before the receiving the reporting message transmitted by the first terminal, the method further comprises:

receiving a notification message that is transmitted by the first terminal in a process of establishing a connection to a second cell or after access to the second cell, wherein the notification message is used to notify the first network-side device that the first terminal has recorded the SMTC configuration information of the first cell; and transmitting a reporting indication message to the first terminal; wherein the receiving the reporting message transmitted by the first terminal comprises:

receiving the reporting message that is transmitted by the first terminal based on the reporting indication message.

8. The receiving method according to claim 7, wherein the notification message is a minimization of drive tests (MDT) data reporting message.

9. The receiving method according to claim 7, wherein, after the receiving the reporting message transmitted by the first terminal, the method further comprises:

forwarding the SMTC configuration information to another network-side device.

10. A terminal, comprising a processor, a memory, and a computer program stored in the memory and capable of running on the processor, wherein when the computer program is executed by the processor, a reporting method is implemented, and the method comprises:

transmitting a reporting message to a first network-side device, wherein the reporting message carries synchronization broadcast signal block measurement timing configuration (SMTC) configuration information of a first cell;

wherein the transmitting the reporting message to the first network-side device comprises:

in a process of establishing a connection to a second cell or after access to the second cell, transmitting the SMTC configuration information of the first cell to the first network-side device;

or, wherein, before the transmitting the reporting message to the first network-side device, the method further comprises:

in a process of establishing a connection to a second cell or after access to the second cell, transmitting a notification message to the first network-side device, wherein the notification message is used to notify the first network-side device that the terminal has recorded the SMTC configuration information of the first cell; and the transmitting the reporting message to the first network-side device comprises:

in a case in which a reporting indication message transmitted by the first network-side device is received, transmitting the reporting message to the first network-side device.

11. The terminal according to claim 10, wherein, before the transmitting the reporting message to the first network-side device, the method further comprises:

obtaining the SMTC configuration information of the first cell.

12. The terminal according to claim 11, wherein the obtaining the SMTC configuration information of the first cell comprises:

receiving SMTC configuration information of the first cell transmitted by a second network-side device; or calculating the SMTC configuration information of the first cell based on a blindly detected synchronization broadcast signal (SS/PBCH) block of the first cell.

13. A network-side device, the network-side device being a first network-side device, comprising a processor, a memory, and a computer program stored in the memory and capable of running on the processor, wherein when the computer program is executed by the processor, the steps of the receiving method according to claim 7 are implemented.

\* \* \* \* \*